INVENTOR.
KARL FISCHER
BY
Michael J. Striker
ATTORNEY

Oct. 11, 1966 K. FISCHER 3,277,811
FLOOR COVERING WITH HEATING MEANS
Filed Dec. 27, 1963 3 Sheets-Sheet 2

INVENTOR.
KARL FISCHER
BY
Richard J. Striker
ATTORNEY

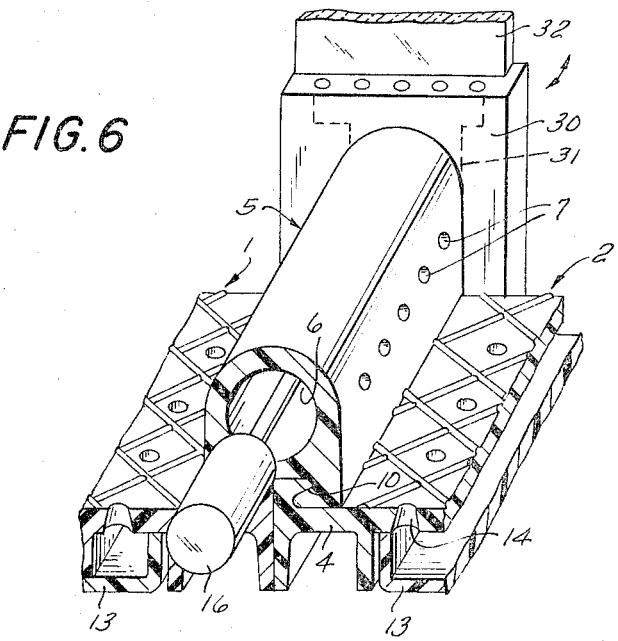
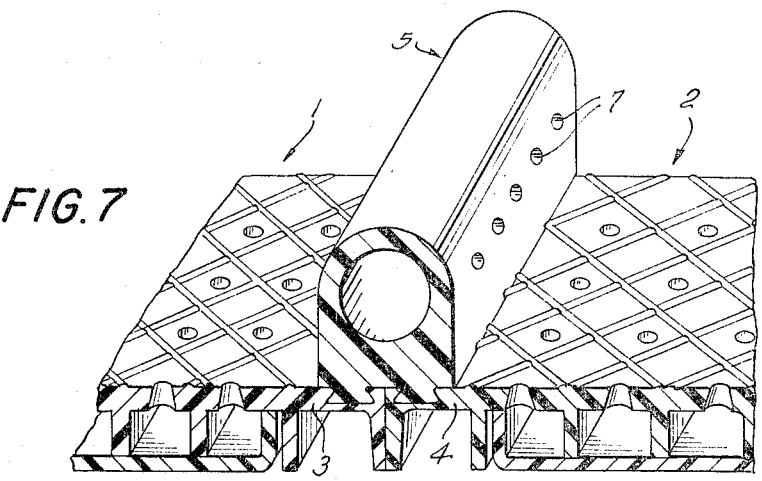

United States Patent Office 3,277,811
Patented Oct. 11, 1966

3,277,811
FLOOR COVERING WITH HEATING MEANS
Karl Fischer, Ludwigshafen (Rhine), Germany, assignor to Schildkröt Aktiengesellschaft vorm. Rheinische Gummi- und Celluloid-Fabrik
Filed Dec. 27, 1963, Ser. No. 333,854
24 Claims. (Cl. 98—2)

The present invention relates to floor coverings in general, and more particularly to an improved floor mat for automotive vehicles.

It is an important object of the present invention to provide a floor mat which is constructed and assembled in such a way that it constitutes a soundproofing body to prevent or to reduce the penetration of noises into the passenger compartment.

Another object of the invention is to provide a floor mat which serves to distribute controlled quantities of heat to various sections of the floor, i.e. of the inner surface of the bottom wall of the vehicle, and to thereby heat the passenger compartment in an automotive vehicle so that there is no need for additional heat distributing conduitry.

A further object of the invention is to provide a floor mat of the above outlined characteristics which is constructed and assembled in such a way that any dust, dirt and other solid or liquid contaminants are automatically collected in response to vibrations which develop when the vehicle is in motion so that such contaminants may be readily disposed of at desired intervals.

An additional object of the invention is to provide a floor mat which will automatically deliver heat to doors or other movable parts of the automotive vehicle so that heating of window panes may be accomplished with the same conduitry which delivers heat to various sections of the floor space.

Still another object of the invention is to provide a composite floor mat which may be readily assembled or taken apart without necessitating any tools for such operation, which is easy to clean, which is of eye-pleasing appearance, which can be manufactured at low cost of readily available materials, and which may be manufactured in any desired size or shape so as to fit all types of automotive vehicles.

With the above objects in view, one feature of the present invention resides in the provision of a floor covering for automotive vehicles of the type having an air heating device of any known design. The floor covering comprises a pair of flexible panels having adjacent elongated marginal portions, and a coupling element which detachably connects the marginal portions of the panels to each other. The coupling elements may form an air conveying tube defining a hot air channel and is then provided with orifices through which hot air may escape from the channel into the space above the panels when the coupling element receives hot air from the heating device. Heating devices which serve to deliver hot air into the passenger compartments of automotive vehicles are well known in the art and, therefore, the exact construction of such heating devices forms no part of the present invention. Alternatively, the air conveying tube may constitute an integral or detachable component part of a panel and may be provided in addition to the coupling element.

In accordance with another feature of the invention, the channel of a tubular coupling element or of a separate air conveying tube may be provided with a suitable mouthpiece at one of its ends to deliver hot air into the intake of a conduit or passage provided in a door or in another movable part of the vehicle. Thus, when the door is closed, the tube will deliver hot air to the passage which is provided in or on the door and which may distribute hot air to one or more window panes to prevent fogging on cold days.

The novel features which are considered as characteristic of the invention are set forth in particular in the appended claims. The improved floor mat itself, however, both as to its construction and the method of assembling and using the same, together with additional features and advantages thereof, will be best understood from the following detailed description of certain specific embodiments with reference to the accompanying drawings, in which:

FIG. 6 is a similar fragmentary perspective view as seen in FIG. 1 showing also a movable part and the heating arrangement thereof;

FIG. 7 is a fragmentary perspective view of a floor mat with a modified coupling element.

Figure 1:
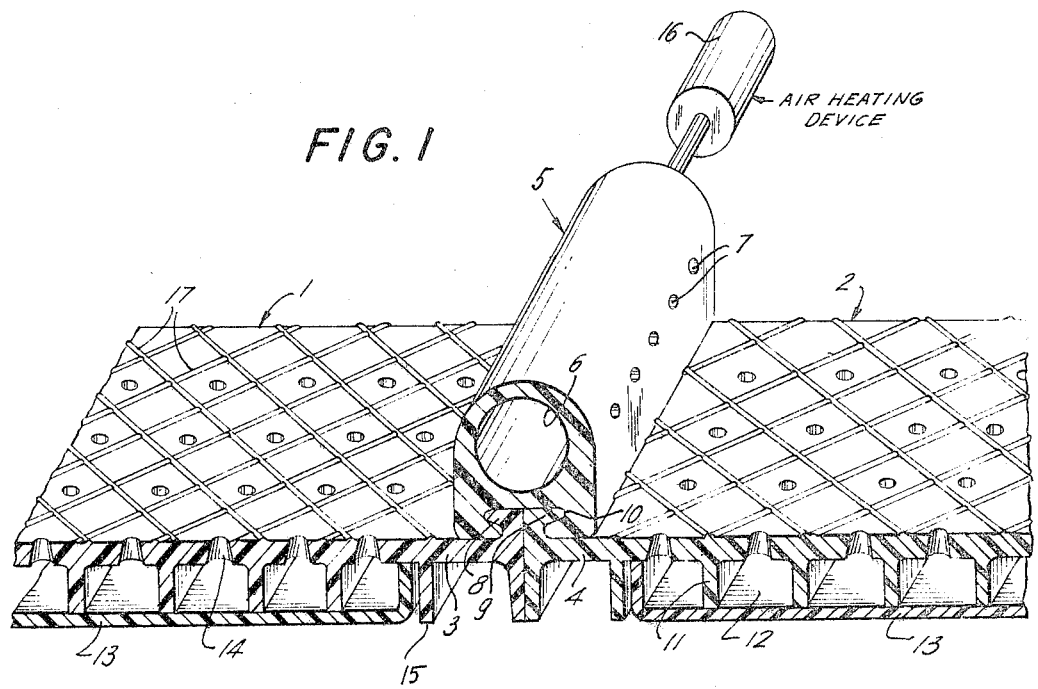
FIG. 1 is a fragmentary perspective view of a floor mat which embodies one form of the invention.

Referring to FIG. 1, there is shown a floor mat comprising a pair of adjacent flexible panels 1, 2 which consist of suitable wear-resistant synthetic plastic material and whose abutting elongated marginal portions 3, 4 are connected with an elongated tubular coupling element 5 defining a channel 6 for the passage of hot air. The wall of the coupling element is formed with orifices 7 through which hot air may penetrate from the channel 6 into the passenger compartment of the automotive vehicle in which the floor mat is put to use. The marginal portions 3, 4 are provided with elongated upwardly extending beaded or flanged ribs 8, 9 which are received in a complementary groove 10 at the underside of the lower portion of the coupling element 5. This element also consists of synthetic plastic material and is sufficiently deformable so that its lower portion may be forced apart to release the ribs 8, 9 if a person wishes to separate the panels 1, 2 from each other. If desired, the coupling element may be made integral with one of the panels.

The underside of each panel is provided with a plurality of ribs 11 which are parallel with the coupling element 5 and which define between themselves sound absorbing compartments 12. The ribs 11 rest on the bottom walls of shallow tray-like receptacles 13 serving to collect particles of dust and/or moisture. The panels 1, 2 are formed with suitably distributed conical apertures 14 which diverge in a direction toward the bottom walls of the respective receptacles 13 and through which liquid or solid contaminants may descend into the receptacles. It is to be noted that the apertures 14 are disposed between the ribs 11.

Adjacent to their interconnected marginal portions 3, 4, the panels 1, 2 are provided with somewhat longer ribs 15 which extend to the level of the undersides of the receptacles 13 so that the marginal portions are held at the level of the remainder of the respective panels. Of course, the two receptacles 13 may be replaced by a single receptacle so that the longer ribs 15 may be replaced by ribs whose height need not exceed the height of the ribs 11.

The channel 6 is connected to a suitable air heating device 16 (shown schematically because its construction forms no part of this invention) so that the orifices 7 discharge hot air into any desired section of the passenger compartment above the floor mat in order to heat the feet of the occupants and to heat the entire passenger compartment of the vehicle. If the coupling element 5 extends transversely of the direction of forward movement of the vehicle, it may serve as a comfortable foot rest for the occupants. The upper sides of the panels 1, 2 are provided with raised portions 17 to prevent slippage, especially if the panels are wet.

The receptacles 13 may be rigid or they may consist of the same material as the panels 1, 2 and element 5, for example, polyethylene or the like.

The ribs 11, 15 reduce the overall weight of the floor mat and, by forming the aforementioned compartments 12, improve the soundproofing characteristics of the mat. When the vehicle is in motion, any foreign matter which is small enough to pass through the apertures 14 will automatically descend into the receptacles 13 and may be evacuated at necessary intervals.

Figure 2:
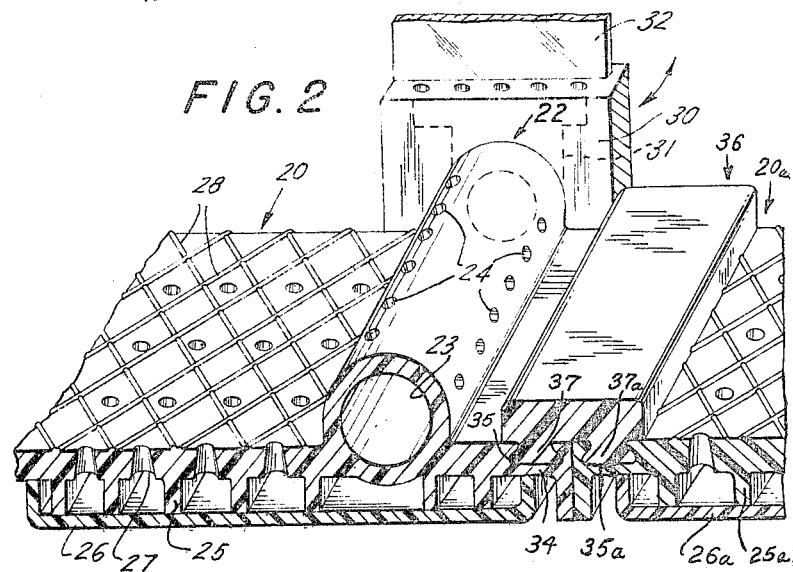
FIG. 2 is a similar fragmentary perspective view of a modified floor mat.

FIG. 2 shows a modified floor mat wherein a panel 20 is integrally connected with an air conveying tube 22. This tube has a channel 23 and orifices 24, and the panel 20 is provided with downwardly extending ribs 25 which rest on the bottom wall of a receptacle 26. The apertures 27 are configurated in the same way as described in connection with FIG. 1, and the upper side of the panel 20 is provided with friction generating raised portions 28. It will be noted that a portion of the tube 22 extends to the level below the underside of the panel 20.

FIG. 2 further shows a portion of an automobile door 30 which is formed with a passage 31 leading to the window pane 32. The intake of this passage communicates with a suitable mouthpiece at one end of the channel 23 when the door 30 is closed so that the window pane 32 is heated in a fully automatic way when the vehicle is in motion and when the heating device 16 (not shown in FIG. 2) is on. The tube 22 of FIG. 2 serves as a foot rest, as a conveyor of hot air to the passenger compartment, and as a conveyor of hot air to one or more window panes.

The marginal portion 34 of the panel 20 is provided with a groove 35 which receives a rib 37 provided at the underside of a flexible coupling element 36. This coupling element 36 has a second rib 37a which is received in a groove 35a provided in a second panel 20a. The panel 20a is a mirror symmetrical replica of the panel 20 and its downwardly extending ribs 25a extend into a receptacle 26a. It goes without saying that the panel 20a may be provided with or coupled to a second air conveying tube similar to the tube 22, and that such second tube may receive hot air directly from the heating device or from the tube 22. For example, the tube 22 may deliver hot air to one door and the second tube will then deliver hot air to the other door.

Figure 3:
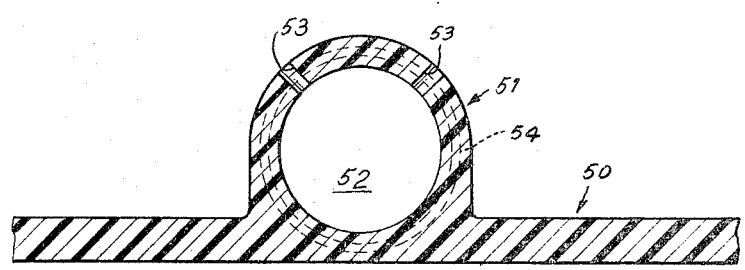
FIG. 3 is a section through a one-piece floor mat.

FIG. 3 shows a portion of a one-piece floor mat having a single flexible panel 50 which is integral with an air conveying tube 51 defining a channel 52 which discharges hot air through orifices 53 so that such air may heat the space above the panel 50. The tube constitutes a foot rest and is reinforced by stiffening means here shown as a helically convoluted wire 54 which is embedded in the material of the tube.

It goes without saying that the panel or panels of my improved floor mat may be reinforced in a different way and that the reinforcing means may comprise one or more stiffening elements provided in each section of the mat or at least in the region of each air conveying tube.

The material of the air conveying tube or tubes is a good insulator which prevents undesirable exchange of heat between the stream of hot air and the floor structure of the article.

Figure 4:
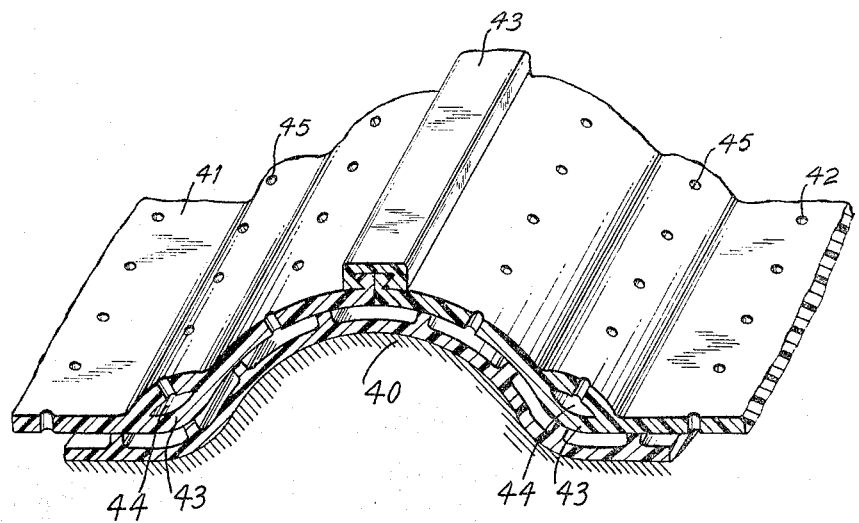
FIG. 4 is a fragmentary perspective view of a floor mat which overlies the hump in the floor of an automotive vehicle.

FIG. 4 illustrates a portion of a hump 40 in the floor of an automobile vehicle. This hump accommodates the propeller shaft and the transmission case in a vehicle wherein the engine is located in front of the passenger compartment. The hump 40 is covered by a composite floor mat including two panels 41, 42 joined by a coupling element 43 which extends along the crest of the hump and which is readily detachable from at least one of the panels.

Each panel is provided with an integral air conveying tube 43 defining a channel 44 and having orifices 45 which discharge hot air into the passenger compartment when the heater is on. It will be noted that the tubes 43 are accommodated in the troughs between the base of the hump 40 and the adjacent floor sections so that they are normally protected against excessive deformation by a shoe or the like. Thus, the panels 41, 42 need not be stiffened with wires or the like.

Figure 5:
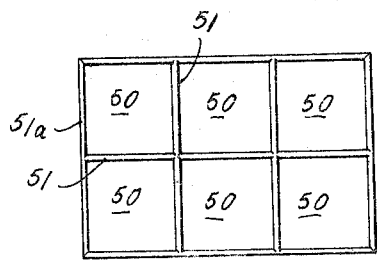
FIG. 5 is a schematic top plan view of another floor mat.

FIG. 5 shows a floor mat which comprises a large number of panels 50 having adjacent marginal portions which are connected with tubular coupling elements 51. Additional tubes 51a are connected to or integral with such marginal portions of the panels 50 which are spaced from the other panels so that hot air discharged through the orifices (not shown) of the tubes 51a will heat the space surrounding the composite floor mat of FIG. 5.

FIG. 6 shows a floor mat comprising a pair of adjacent flexible panels 1, 2 connected with an elongated tubular coupling element 5 defining a channel 6. A portion of an automobile door 30 is formed with a passage 31 leading to the window pane 32. The intake of this passage communicates with a suitable mouthpiece at one end of channel 6 for heating of the window pane 32, when the heating device 16 connected to the other end of channel 6 is on.

FIG. 7 shows a floor mat with a coupling element, portions of which extend to a level below the floor panels.

The floor mat may be manufactured of suitably colored synthetic plastic material to enhance the appearance of the passenger compartment.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A floor covering for automotive vehicles of the type having an air heating device, comprising an apertured panel of flexible material having an underside provided with downwardly extending ribs defining between themselves a plurality of compartments; a receptacle disposed beneath said panel and having a bottom wall supporting said ribs; and at least one air conveying tube connected with said panel and having a portion provided with orifices which discharge hot air into the space above said panel when said tube receives hot air from the heating device.

2. A plastic floor covering for automotive vehicles of the type having an air heating device, comprising a pair of flexible apertured panels having adjacent marginal portions; a tubular coupling element connected with said marginal portions, said coupling element defining a hot air channel and having orifices through which hot air may escape from said channel into the surrounding atmosphere when said coupling element receives hot air from the heating device; and receptacle means disposed beneath said panels to collect any contaminants deposited on and passing through said apertured panels.

3. A heating arrangement for automotive vehicles, comprising an air heating device, a plurality of flexible panel means having adjacent marginal portions; and a plurality of tubular coupling elements connected with said marginal portions, said coupling elements defining hot air channels connected to said air heating device and having orifices through which hot air may be discharged from said channels into the space above said panel means when said channels receive hot air from said air heating device.

4. A heating arrangement as set forth in claim 3, wherein said panel means have additional marginal portions spaced from the other panel means, and further comprising air conveying tubes connected with said additional marginal portions, said tubes defining channels and having orifices which discharge hot air into the space surrounding said floor covering when the channels of said tubes receive hot air from the heating device.

5. In an automotive vehicle, in combination, an air heating device; a movable part arranged to move between two spaced positions and comprising a passage for hot air having an intake adjacent to the floor of the vehicle; and a floor mat comprising a pair of flexible panels having adjacent marginal portions, and a tubular coupling element connecting said marginal portions, said coupling element defining an elongated hot air channel one end of which is connected with said heating device and the other end of which communicates with the intake of said passage when said movable part is in one of said positions so that hot air may flow from said heating device to said passage, said coupling element having orifices through which hot air may be discharged from said channel into the surrounding atmosphere.

6. In an automotive vehicle, in combination, an air heating device; a movable part arranged to move between two spaced positions and comprising a passage for hot air having an intake adjacent to the floor of the vehicle; and a floor mat comprising a flexible panel and an air conveying tube connected with said panel and defining an elongated channel one end of which is connected with said heating device and the other end of which communicates with the intake of said passage when said movable part is in one of said positions so that hot air may flow from said heating device to said passage.

7. A combination as set forth in claim 6, wherein said tube is provided with orifices which discharge hot air into the space above said panel when said channel receives hot air from said heating device.

8. A combination as set forth in claim 6, wherein said movable part is a door and wherein the intake of said passage communicates with said other end of said channel when the door is in closed position whereby hot air admitted to said passage may heat the window pane of the door.

9. A combination as set forth in claim 6, wherein said tube is integral with and consists of the same material as said panel.

10. A plastic floor covering for automotive vehicles of the type having an air heating device, comprising a pair of flexible panels having adjacent marginal portions, each panel further having a plurality of downwardly extending ribs and apertures disposed between said ribs; a tubular coupling element connected with said marginal portions, said coupling element defining a hot air channel and having orifices through which hot air may escape from said channel into the surrounding atmosphere to heat the passenger compartment of the automotive vehicle when the coupling element receives hot air from said heating device; and receptacle means disposed beneath said panels and having bottom wall means supporting said ribs whereby any foreign matter deposited on said panels and capable of passing through said apertures automatically accumulates in said receptacle means in response to vibration of said panels when the vehicle is in motion.

11. A floor covering as set forth in claim 10, wherein said apertures diverge in a direction toward said bottom wall means.

12. A floor covering as set forth in claim 10, wherein said ribs define between themselves a plurality of sound-proofing compartments and wherein said panels have upper sides provided with friction generating raised portions.

13. A floor covering as set forth in claim 10, wherein said marginal portions comprise upwardly extending ribs and wherein said coupling element has a lower portion provided with a recess which receives said upwardly extending ribs so that the coupling element is detachably connected with said panels.

14. A floor covering as set forth in claim 10, wherein a portion of said coupling element extends to a level below said panels.

15. A floor covering as set forth in claim 10, wherein said reciprocal means comprises a separate receptacle for each of said panels and wherein said receptacles are slightly spaced from said marginal portions, said panels having additional ribs which are disposed between said receptacles and extend to the floor level.

16. A floor covering as set forth in claim 15, wherein all of said ribs are parallel with said coupling element.

17. In a vehicle, a wall having an inner surface; an air heating device; flexible panel means having an upper and a lower surface; and at least one air conveying tube connected with said air heating device and said panel means and extending along said upper surface thereof, said tube being provided with a plurality of orifices located in the wall thereof above said upper surface of said panel means for supplying hot air into the space above said panel means when the interior of said tube communicates with said air heating device, so that hot air is discharged through said orifices into the space above said panel means in direction away from said upper surface of the panel means, said panel means extending transversely below said tube and overlying at least a part of said inner surface of said vehicle whereby to provide insulation reducing dissipation of heat through said wall of said vehicle.

18. A structure as set forth in claim 17, wherein said tube is integral with said panel means.

19. A heating arrangement for automotive vehicles, comprising an air heating device; flexible panel means having an upper and a lower suface; and at least one air conveying tube connected with said air heating device and said panel means and extending along said upper surface of the latter, said tube being shaped as a tubular footrest and being provided with a plurality of orifices located in the wall thereof above said upper surface of said panel means for supplying hot air into the space above said panel means when the interior of the tube communicates with said air heating device, so that hot air is discharged through said orifices into the space in direction away from said upper surface of said panel means, said panel means extending transversely below said tube and providing insulation of a floor which it overlies for reducing dissipation of heat through such floor.

20. A heating arrangement for automotive vehicles, comprising an air heating device; flexible panel means having an upper and a lower surface; and at least one air conveying tube connected with said air heating device and said panel means and extending along said upper surface of said panel means partly recessed therewithin said tube being provided with a plurality of orifices located in the wall thereof above said upper surface of said panel means for supplying hot air into the space above said panel means when the interior of the tube communicates with said air heating device, so that hot air is discharged through said orifices into the space in direction away from said upper surface of said panel means, said panel means extending transversely below said tube and providing insulation of a floor which it overlies for reducing dissipation of heat through such floor.

21. A heating arrangement for automotive vehicles, comprising an air heating device; flexible panel means made from heat-insulating material and having an upper and a lower surface; and at least one air conveying tube connected with said air heating device and said panel means and extending along said upper surface of the latter, said tube being provided with a plurality of orifices located in the wall thereof above said upper surface of said panel means for supplying hot air into the space above said panel means when the interior of the tube communicates with said air heating device, so that hot air is discharged through orifices into the space in direction away from said upper surface of said panel means, said panel means extending transversely below said tube and providing insulation of a floor which is overlies for reducing dissipation of heat through such floor.

22. A heating arrangement for automotive vehicles, comprising an air heating device; flexible panel means having an upper and a lower surface; at least one air conveying tube connected with said air heating device and said panel means and extending along said upper surface of the latter, said tube being provided with a plurality of orifices located in the wall thereof above said upper surface of said panel means for supplying hot air into the space above said panel means when the interior of the tube communicates with said air heating device, so that hot air is decharged through said orifices into the space in direction away from said upper surface of said panel means, said panel means extending transversely below said tube and providing insulation of a floor which it overlies for reducing dissipation of heat through such floor.

23. A heating arrangement for automotive vehicles comprising an air heating device; at least two flexible panel means each having an upper surface and a lower surface and having marginal portions abutting against each other; a coupling element releasably connecting said marginal portions for holding the same in abutting relationship; and at least one air conveying tube connected with said air heating device and said panel means and extending along said upper surfaces of the latter, said tube being provided with a plurality of orifices located in the wall thereof above said upper surfaces of said panel means for supplying hot air into the space above said panel means when the interior of the tube communicates with said air heating device, so that hot air is discharged through said orifices into the space in direction away from said upper surfaces of said panel means, said panel means extending transversely below said tube and providing insulation of a floor which it overlies for reducing dissipation of heat through such floor.

24. A heating arrangement for automotive vehicles, comprising an air heating device; at least two flexible panel means each having an upper surface and a lower surface and having marginal portions abutting each other; a coupling element releasably connecting said marginal portions for holding the same in abutting relationship, said coupling means being integral with one marginal portion and being detachable from the other marginal portion; and at least one air conveying tube connected with said air heating device and said panel means and extending along said upper surfaces of the latter, said tube being provided with a plurality of orifices located in the wall thereof above said upper surfaces of said panel means for supplying hot air into the space above said panel means when the interior of the tube communicates with said air heating device, so that hot air is discharged through said orifices into the space in a direction away from said upper surfaces of said panel means, said panel means extending transversely below said tube and providing insulation of a floor which it overlies for reducing dissipation of heat through such floor.

References Cited by the Examiner
UNITED STATES PATENTS

| | | |
|---|---|---|
| 1,537,460 | 5/1925 | Campbell. |
| 1,777,982 | 10/1930 | Popp. |
| 2,460,269 | 2/1949 | Appeldoorn _____ 165—46 X |
| 2,750,232 | 6/1956 | Szantay. |
| 2,920,829 | 1/1960 | Shane _____ 98—2 |
| 2,935,748 | 5/1960 | Sabo _____ 165—46 X |
| 2,996,255 | 8/1961 | Boylan _____ 98—2 |

MEYER PERLIN, *Primary Examiner.*